(12) United States Patent
Jeon et al.

(10) Patent No.: US 10,494,481 B2
(45) Date of Patent: Dec. 3, 2019

(54) POLYMER FOR OPTICAL FILM, AND OPTICAL FILM INCLUDING THE SAME

(71) Applicant: SAMSUNG ELECTRONICS CO., LTD., Suwon-si, Gyeonggi-do (KR)

(72) Inventors: Hyun Jeong Jeon, Seoul (KR); Byung Hee Sohn, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 118 days.

(21) Appl. No.: 15/367,288

(22) Filed: Dec. 2, 2016

(65) Prior Publication Data

US 2017/0081478 A1     Mar. 23, 2017

Related U.S. Application Data

(62) Division of application No. 14/341,969, filed on Jul. 28, 2014.

(30) Foreign Application Priority Data

Nov. 29, 2013  (KR) .......................... 10-2013-0147626

(51) Int. Cl.
*C08G 73/10* (2006.01)
*C08J 5/18* (2006.01)
(Continued)

(52) U.S. Cl.
CPC ..... *C08G 73/1067* (2013.01); *C08G 73/1042* (2013.01); *C08J 5/18* (2013.01);
(Continued)

(58) Field of Classification Search
None
See application file for complete search history.

(56) References Cited

U.S. PATENT DOCUMENTS 5,071,997 A    12/1991   Harris
5,268,416 A    12/1993   Traubel et al.
(Continued)

FOREIGN PATENT DOCUMENTS

JP    02209923 A  *  8/1990
JP    11343344 A     12/1999
(Continued)

OTHER PUBLICATIONS

Final Office Action dated Feb. 19, 2016, issued for U.S. Appl. No. 14/341,969.
(Continued)

*Primary Examiner* — Rachel Kahn
(74) *Attorney, Agent, or Firm* — Cantor Colburn LLP (57) ABSTRACT

A composition for preparing an optical film, comprising a tetracarboxylic acid dianhydride represented by Chemical Formula 1, a first diamine represented by Chemical Formula 2, and a second diamine represented by Chemical Formula 3, wherein an amount of the second diamine represented by Chemical Formula 3 is equal to or less than 30 mol % based on the total amount of the first and second diamines:

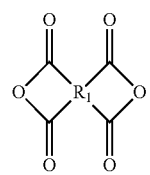

Chemical Formula 1

Chemical Formula 2

(Continued)

-continued

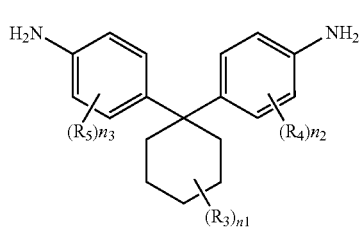

Chemical Formula 3 wherein, $R^1$ to $R^5$, n1 to n3 are defined in the specification.

6 Claims, 2 Drawing Sheets

(51) Int. Cl.
*C09D 179/08* (2006.01)
*G02F 1/1333* (2006.01)

(52) U.S. Cl.
CPC ..... *C09D 179/08* (2013.01); *G02F 1/133305* (2013.01); *C08J 2379/08* (2013.01); *G02F 2413/11* (2013.01)

(56) References Cited

U.S. PATENT DOCUMENTS

| | | |
|---|---|---|
| 6,031,067 A | 2/2000 | Choi et al. |
| 6,054,554 A | 4/2000 | Choi et al. |
| 9,594,187 B2 | 3/2017 | Cho et al. |

FOREIGN PATENT DOCUMENTS

| | | |
|---|---|---|
| KR | 10-0205962 B2 | 4/1999 |
| KR | 1020130125640 A | 11/2013 |

OTHER PUBLICATIONS

NFOA, Issued Aug. 27, 2015, issued for U.S. Appl. No. 14/341,969.
Office Action dated Aug. 20, 2019 of the corresponding Korean Patent Application No. 10-2013-0147626.

\* cited by examiner

POLYMER FOR OPTICAL FILM, AND OPTICAL FILM INCLUDING THE SAME

CROSS-REFERENCE TO RELATED APPLICATION

This application is a division of U.S. patent application Ser. No. 14/341,969, filed on Jul. 28, 2014, which claims priority to Korean Patent Application No. 10-2013-0147626, filed on Nov. 29, 2013, and all the benefits accruing therefrom under 35 U.S.C. § 119, the contents of which are incorporated herein in their entirety by reference.

BACKGROUND

1. Field

This disclosure relates to a polymer for optical film, and to an optical film including the polymer.

2. Description of the Related Art

Flat panel displays may be classified into emitting display devices that emit light by themselves and non-emitting display devices that require separate light sources. Optical compensation films such as phase difference films may be often used for improving image quality of the flat panel displays.

In an emitting display device, for example, an organic light emitting display, visibility and contrast ratio may be decreased due to reflection of external light by metal such as an electrode in the display device. In order to reduce such deterioration, a polarizing plate and a phase difference film are used to prevent the external light reflected in the display device from leaking out of the display device.

In a liquid crystal display ("LCD"), which is a kind of non-emitting display device, elliptical polarization and light leakage may occur due to birefringence of liquid crystal and crossed polarizing plates in the display device, thereby decreasing contrast ratio and causing color shift. As for the liquid crystal display, the device may become thicker due to the thickness of the liquid crystal, and thus the thickness retardation ("$R_{th}$") may be a more serious than the in-plane retardation ("$R_e$").

Meanwhile, a need for a flexible display, which is thin and light as a paper, which requires low electric power, and which can be carried without being limited to the place or time, increases. In order to realize the flexible display, a substrate for the flexible display, organic or inorganic material to be processed, flexible electronics, encapsulating and packaging technology, and etc., are strongly desired. Among them, the flexible substrate may be the most important material defining performance, reliability, and price of the flexible display.

Plastic substrates may be useful for manufacturing flexible displays due to the processability, low weight, and compatibility to continuous process. However, since plastic substrates are unstable to heat, their properties need to be improved for use in the flexible displays.

Accordingly, a colorless and transparent material having high temperature stability, low coefficient of thermal expansion ("CTE"), high mechanical strength, and low optical anisotropy is desired to prepare an optical film.

SUMMARY

An embodiment provides a composition for preparing an optical film having high temperature stability, transparency, and low optical anisotropy.

Another embodiment provides a polymer having high temperature stability, transparency, and low optical anisotropy.

Another embodiment provides an optical film having high temperature stability, transparency, and low optical anisotropy, which is prepared from the composition or the polymer.

Another embodiment provides an optical device including the optical film.

According to an embodiment, provided is a composition for preparing an optical film, including
a tetracarboxylic acid dianhydride represented by Chemical Formula 1,
a first diamine represented by Chemical Formula 2, and
a second diamine represented by Chemical Formula 3,
wherein an amount of the second diamine represented by Chemical Formula 3 is equal to or less than 30 mol % based on the total amount of the first and second diamines:

Chemical Formula 1

Chemical Formula 2

Chemical Formula 3 wherein, in Chemical Formula 1 to Chemical Formula 3,
$R^1$ and $R^2$ are the same or different, and are each independently a substituted or unsubstituted C4 to C20 alicyclic organic group, or a substituted or unsubstituted C6 to C30 aromatic organic group, wherein the aromatic organic group includes one aromatic ring, two or more aromatic rings fused together to provide a condensed ring system, or two or more moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, and a substituted or unsubstituted C6 to C15 arylene group,
$R^3$ to $R^5$ are the same or different, and are each independently selected from a C1 to C20 alkyl group, a C6 to C20 aryl group, and a halogen,
n1 is an integer from 0 to 5, and
n2 and n3 are the same or different, and are each independently an integer from 0 to 4.

The amount of the second diamine represented by Chemical Formula 3 may be equal to or less than about 30 mol %, for example, equal to or less than about 25 mol %, for example, equal to or less than about 10 mol %, based on the total amount of the first and second diamines.

In an embodiment, the amount of the second diamine represented by Chemical Formula 3 may be from about 0.1 mol % to about 30 mol %, for example, from about 0.5 mol % to about 25 mol %, for example, from about 1 mol % to about 10 mol %, based on the total amount of the first and second diamines.

The tetracarboxylic acid dianhydride represented by Chemical Formula 1 may be one or more selected from 3,3',4,4'-biphenyltetracarboxylic dianhydride, bicycle[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, and 4-(2,5-dioxotetrahydrofuran-3-yl)-1,2,3,4-tetrahydronaphthalene-1,2-dicarboxylic anhydride.

For example, the tetracarboxylic acid dianhydride represented by Chemical Formula 1 may be 3,3',4,4'-biphenyl tetracarboxylic dianhydride, pyromellitic dianhydride, or a combination thereof.

The first diamine represented by Chemical Formula 2 may be one or more selected from the chemical formulae:

wherein, in the above chemical formulae,

$R^{32}$ to $R^{52}$ are the same or different and may each independently be hydrogen, a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group,

$X^2$ to $X^{12}$ are the same or different and may each independently be a single bond, a substituted or unsubstituted C1 to C10 alkylene group, a substituted or unsubstituted C3 to C10 cycloalkylene group, a substituted or unsubstituted C5 to C40 heterocycloalkylene group, a substituted or unsubstituted C6 to C15 arylene group, a substituted or unsubstituted C3 to C40 heteroarylene group, —$SO_2$—, —O—, —O(=O)—, or a combination thereof, n35 to n37, and n40 to n49, are integers ranging from 0 to 4, and n38 and n39 are integers ranging from 0 to 3.

For example, the first diamine may be selected from compounds represented by the chemical formulae, and a combination thereof.

For example, the first diamine represented by Chemical Formula 2 may be 2,2'-bis(trifluoromethyl)benzidine.

In Chemical Formula 3, $R^3$ to $R^5$ may be the same or different, and may be each independently a methyl group, an ethyl group, a propyl group, a butyl group, a phenyl group, a halogen, or may all be methyl groups, and n1 to n3 may be all the same and may each be the integer of 1, and these substituents may be substituted with one or more of the cyclohexyl group or the phenyl group.

In an exemplary embodiment, $R^3$ to $R^5$ are the same and are all methyl groups, and n1 to n3 are the same and are all the integer of 1.

In an exemplary embodiment, $R^3$ is a methyl group, n1 is the integer of 1, and n2 and n3 are the same and are all the integer of 0.

In an exemplary embodiment, n1 to n3 are the same and are all the integer of 0.

According to another embodiment, provided is a polymer represented by Chemical Formula 4, Chemical Formula 5, or a combination thereof:

Chemical Formula 4

Chemical Formula 5 wherein in Chemical Formula 4 and Chemical Formula 5,
$R^1$ to $R^5$, and n1 to n3 are the same as defined in the above Chemical Formula 1 to Chemical Formula 3, x is a positive real number equal to or less than 0.3, for example $0.001 \leq x \leq 0.3$, for example $0.005 \leq x \leq 0.25$, or for example $0.01 \leq x \leq 0.1$.

The polymer represented by Chemical Formula 5 may be prepared from the polymer represented by Chemical Formula 4 by thermal or chemical curing.

According to yet another embodiment, provided is an optical film prepared from the composition or the polymer.

The film may have an average light transmittance of greater than or equal to about 80%, in a wavelength range of 380 nanometers to 800 nanometers, when measured by a UV spectrometer for a film having a thickness of about 0.1 micrometers (μm) to about 200 micrometers (μm).

For example, the film may have an average light transmittance of greater than or equal to about 85%, in a wavelength range of 380 nanometers to 800 nanometers, when measured by a UV spectrometer for a film having a thickness of about 0.1 micrometers (μm) to about 200 micrometers (μm).

The film may have a coefficient of thermal expansion ("CTE") of less than or equal to about 300 parts per million per degree Centigrade in a temperature range of 50° C. to 400° C., when the film has a thickness of about 0.1 micrometers (μm) to about 200 micrometers (μm).

The film may have a coefficient of thermal expansion of less than or equal to about 50 parts per million per degree Centigrade in a temperature range of 50° C. to 300° C., when the film has a thickness of about 0.1 micrometers (μm) to about 200 micrometers (μm).

The film may have thickness retardation ($R_{th}$) of equal to or less than about 1,000 nanometers, when the film has a thickness of about 0.1 micrometers (μm) to about 200 micrometers (μm).

According to still another embodiment, provided is an optical device including the optical film.

The optical device may be a liquid crystal device, an organic light emitting diode, or a complementary metal-oxide semiconductor.

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

This disclosure will be described more fully hereinafter with reference to the accompanying drawings, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing present embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (—F, —Br, —Cl, or —I), a hydroxyl group, a nitro group, a cyano group, an amino group (—NH$_2$, —NH(R$^{100}$) or —N(R$^{101}$)(R$^{102}$), wherein R$^{100}$, R$^{101}$, and R$^{102}$ are the same or different, and are each independently a C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon having the specified number of carbon atoms and having a valence of at least one. Non-limiting examples of the alkyl group are methyl, ethyl, and propyl.

As used herein, the term "fluoroalkyl group" refers to an alkyl group as defined above, wherein one or more hydrogen atoms are substituted with a fluorine atom. Non-limiting examples of the fluoroalkyl group are fluoromethyl, 2-fluoroethyl, and 3-fluoropropyl.

As used herein, the term "alkoxy group" refers to "alkyl-O—", wherein the term "alkyl" has the same meaning as described above. Non-limiting examples of the alkoxy group are methoxy, ethoxy, propoxy, cyclopropoxy, and cyclohexyloxy.

As used herein, the term "cycloalkyl group" refers to a monovalent group having one or more saturated rings in which all ring members are carbon. Non-limiting examples of the cycloalkyl group are cyclopentyl and cyclohexyl.

As used herein, the term "heterocycloalkyl group" refers to a cycloalkyl group as defined above, wherein one or more of the ring carbon atoms are replaced with a heteroatom selected from O, S, N, P, and Si. Non-limiting example of the heterocycloalkyl group is 2-oxacyclohexyl (2-tetrahydropyranyl).

As used herein, the term "cycloalkoxy group" refers to "cycloalkyl-O—", wherein the term "cycloalkyl" has the same meaning as described above. Non-limiting examples of the cycloalkoxy group are cyclopropoxy and cyclohexyloxy.

As used herein, the term "aryl group", which is used alone or in combination, refers to an aromatic hydrocarbon containing at least one ring. Non-limiting examples of the aryl group are phenyl, naphthyl, and tetrahydronaphthyl.

As used herein, the term "aryloxy group" refers to "aryl-O—", wherein the term "aryl" has the same meaning as described above. Non-limiting examples of the aryloxy group are phenoxy and naphthyloxy.

As used herein, the term "heteroaryl group" refers to an aryl group as defined above, wherein one or more of the ring carbon atoms are replaced with a heteroatom selected from O, S, N, P, and Si. Non-limiting example of the heterocycloalkyl group are 2-pyridyl and 2-furanyl.

As used herein, the terms "alkylene group", "cycloalkylene group", "heterocycloalkylene group", "arylene" group", and "heteroarylene group" refer to a divalent group respectively derived from an alkyl group, a cycloalkyl group, a heterocycloalkyl group, an aryl group, and a heteroaryl group as defined above.

As used herein, when a specific definition is not otherwise provided, the term "alkyl group" refers to a C1 to C30 alkyl group, for example a C1 to C15 alkyl group, the term "fluoroalkyl group" refers to a C1 to C30 fluoroalkyl group, the term "cycloalkyl group" refers to a C3 to C30 cycloalkyl group, for example a C3 to C18 cycloalkyl group, the term "alkoxy group" refer to a C1 to C30 alkoxy group, for example a C1 to C18 alkoxy group, the term "ester group" refers to a C2 to C30 ester group, for example a C2 to C18 ester group, the term "ketone group" refers to a C2 to C30 ketone group, for example a C2 to C18 ketone group, the term "aryl group" refers to a C6 to C30 aryl group, for example a C6 to C18 aryl group, the term "alkenyl group" refers to a C2 to C30 alkenyl group, for example a C2 to C18 alkenyl group, the term "alkynyl group" refers to a C2 to C30 alkynyl group, for example a C2 to C18 alkynyl group, the term "alkylene group" refers to a C1 to C30 alkylene group, for example a C1 to C18 alkylene group, the term "cycloalkylene group" refers to a C3 to C30 cycloalkylene group, and the term "arylene group" refers to a C6 to C30 arylene group, for example a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group comprising one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —O(CH$_3$)$_2$—, —C(CF$_3$)$_2$—, and —C(=O)NH—, for example through —S(=O)$_2$—, for example an aryl group or a C6 to C30 arylene group, for example a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, for example a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, "combination" commonly refers to mixing or copolymerization.

In addition, in the specification, the mark "*" may refer to a point of attachment to another atom.

According to an embodiment, provided is a composition for preparing an optical film, including a tetracarboxylic acid dianhydride represented by following Chemical Formula 1, a first diamine represented by following Chemical Formula 2, and a second diamine represented by following Chemical Formula 3, wherein the second diamine represented by following Chemical Formula 3 is included in an amount equal to or less than 30 mol % based on the total amount of the first and second diamines:

Chemical Formula 1

Chemical Formula 2

Chemical Formula 3

In Chemical Formula 1 to Chemical Formula 3, $R^1$ and $R^2$ are the same or different, and are each independently a substituted or unsubstituted C4 to C20 alicyclic organic group, or a substituted or unsubstituted C6 to C30 aromatic organic group, wherein the aromatic organic group includes one aromatic ring, two or more aromatic rings fused together to provide a condensed ring system, or two or more moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, and a substituted or unsubstituted C6 to C15 arylene group, $R^3$ to $R^5$ are the same or different, and are each independently selected from a C1 to C20 alkyl group, a C6 to C20 aryl group, and a halogen (F, Cl, Br, I), n1 is an integer from 0 to 5, and n2 and n3 are the same or different, and are each independently an integer from 0 to 4.

The tetracarboxylic acid dianhydride represented by Chemical Formula 1 may be one or more of 3,3',4,4'-biphenyltetracarboxylic dianhydride ("BPDA"), bicycle [2.2.2]oct-7-ene-2,3,5,6-tetracarboxylic dianhydride ("BTDA"), 3,3',4,4'-diphenylsulfone tetracarboxylic dianhydride ("DSDA"), 4,4'-(hexafluoroisopropylidene)diphthalic anhydride ("6FDA"), 4,4'-oxydiphthalic anhydride ("ODPA"), pyromellitic dianhydride ("PMDA"), and 4-(2,5-dioxotetrahydrofuran-3-yl)-1,2,3,4-tetrahydronaphthalene-1,2-dicarboxylic anhydride ("DTDA").

In an exemplary embodiment, the tetracarboxylic acid dianhydride represented by Chemical Formula 1 may be 3,3',4,4'-biphenyl tetracarboxylic dianhydride ("BPDA"), pyromellitic dianhydride ("PMDA"), or a combination thereof.

In an exemplary embodiment, the tetracarboxylic acid dianhydride represented by Chemical Formula 1 may be 3,3',4,4'-biphenyl tetracarboxylic dianhydride ("BPDA") and pyromellitic dianhydride ("PMDA") in a mole ratio of about 50 to 95:about 5 to 50, for example, about 60 to 90:about 10 to 40, for example about 70 to 80:about 20 to 30.

The first diamine represented by Chemical Formula 2 may be one or more selected from the following chemical formulae:

In the above chemical formulae, $R^{32}$ to $R^{52}$ are the same or different and may each independently be hydrogen, a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group,

$X^2$ to $X^{12}$ are the same or different and may each independently be a single bond, a substituted or unsubstituted C1 to C10 alkylene group, a substituted or unsubstituted C3 to C10 cycloalkylene group, a substituted or unsubstituted C5 to C40 heterocycloalkylene group, a substituted or unsubstituted C6 to C15 arylene group, a substituted or unsubstituted C3 to C40 heteroarylene group, —SO$_2$—, —O—, —C(=O)—, or a combination thereof, n35 to n37, and n40 to n49, are integers ranging from 0 to 4, and n38 and n39 are integers ranging from 0 to 3.

For example, the first diamine may be selected from compounds represented by the following chemical formulae, and a combination thereof:

-continued

In an exemplary embodiment, the first diamine represented by Chemical Formula 2 may be 2,2'-bis(trifluoromethyl)benzidine ("TFDB").

In Chemical Formula 3, $R^3$ to $R^5$ may be the same or different, and may be each independently methyl, ethyl, propyl, butyl, phenyl, or halogen (F, Cl, Br, I), all methyl groups, and n1 to n3 may be all the same and may each be the integer of 1, and these substituents may be substituted to one or more of the cyclohexyl group or the phenyl group.

In an exemplary embodiment, $R^3$ to $R^5$ are the same and are all methyl groups, and n1 to n3 are the same and are all the integer of 1.

In an exemplary embodiment, $R^3$ is a methyl group, n1 is the integer of 1, and n2 and n3 are the same and are all the integer of 0.

In an exemplary embodiment, n1 to n3 are the same and are all the integer of 0.

As shown from the later-described examples, the film prepared from the composition, for example from the composition including the second diamine represented by the above Chemical Formula 3 in an amount of equal to or less than about 30 mol % based on the total amount of the first and second diamines have an average light transmittance of greater than or equal to about 80%, in a wavelength range of 380 nanometers to 800 nanometers, when measured by a UV spectrometer for a film having a thickness of about 10 micrometers (μm). For example, the optical film may have an average light transmittance of greater than or equal to about 85%, in a wavelength range of 380 nanometers to 800 nanometers, when measured by a UV spectrometer for a film having a thickness of about 10 micrometers (μm).

Film having an average light transmittance of greater than or equal to about 80%, for example greater than or equal to about 85%, in a wavelength range of 380 nanometers to 800 nanometers, is transparent enough to be used as an optical film.

Further, the films prepared from the composition, for example from the composition including the second diamine represented by the above Chemical Formula 3 in an amount of less than about 10 mol %, for example, in an amount of less than about 5 mol %, based on the total amount of the first and second diamines have an average light transmittance of greater than or equal to about 50%, for example greater than or equal to about 55%, and for example greater than or equal to about 60%, in a wavelength of 400 nanometers. Such films have greatly improved light transmittance in a short wavelength of 400 nanometers. The improvement of light transmittance of the films in a wavelength of 400 nanometers may be very advantageous in manufacturing a flexible substrate for a display device.

Meanwhile, an optical film prepared from the composition may have a thickness retardation ($R_{th}$) of equal to or less than about 1,000 nanometers (nm), for example, equal to or less than about 900 nanometers (nm), for example, equal to or less than about 800 nanometers (nm). In an embodiment, when the film is prepared from a composition including the second diamine represented by the above Chemical Formula 3 in an amount of equal to or less than about 5 mol %, the film may have a thickness retardation ($R_{th}$) of equal to or less than about 850 nanometers (nm) and a very low optical anisotropy.

Further, the film prepared from the composition may have a coefficient of thermal expansion ("CTE") of less than or equal to about 300 parts per million per degree Centigrade ("ppm/° C."), for example, a coefficient of thermal expansion ("CTE") of less than or equal to about 200 parts per million per degree Centigrade ("ppm/° C."), in a temperature range of 50° C. to 400° C., when the film has a thickness of about 0.1 micrometers (μm) to about 200 micrometers (μm).

The film may have a coefficient of thermal expansion ("CTE") of less than or equal to about 50 parts per million per degree Centigrade ("ppm/° C.") in a temperature range of 50° C. to 300° C., when the film has a thickness of about 0.1 micrometers (μm) to about 200 micrometers (μm).

Figure 1:
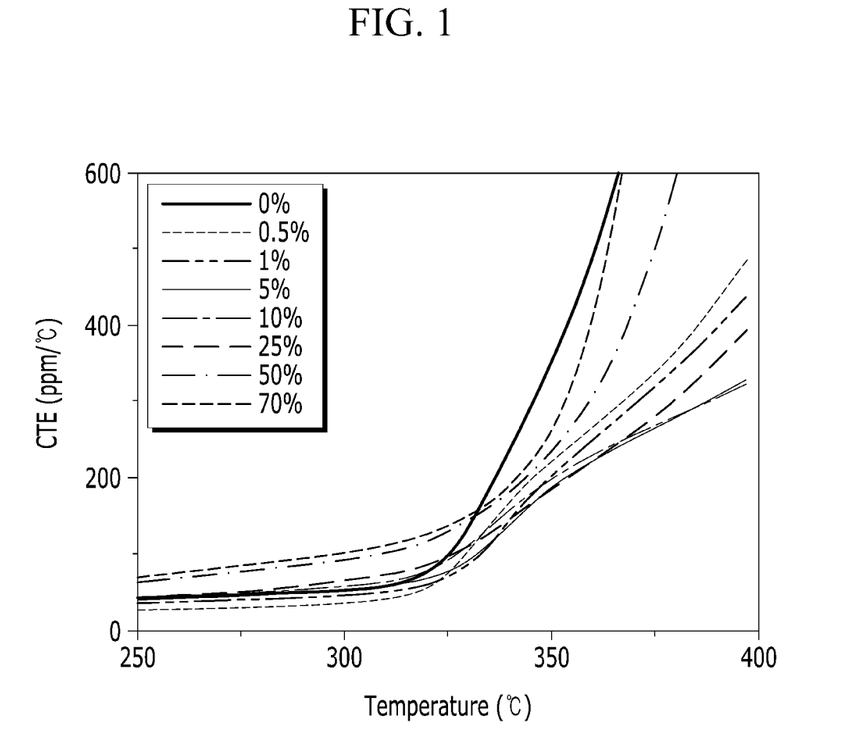
FIG. 1 shows graphs of coefficient of thermal expansion ("CTE") (parts per million per degree Centigrade, ppm/° C.) versus temperature (degree Centigrade, ° C.) for the films having different content of BACH (1,1-bis(4-aminophenyl) cyclohexane).

As shown in FIG. 1, the "CTE", i.e., the ratio of increase of volume to the increase of temperature of a polymer smoothly increases to the glass transition temperature ("Tg"), while the CTE rapidly increases over the glass transition temperature.

FIG. 1 shows graphs of coefficient of thermal expansion ("CTE") (parts per million per degree Centigrade, ppm/° C.) versus temperature (degree Centigrade, ° C.), for the films having different content of BACH (1,1-bis(4-aminophenyl) cyclohexane). For example, the CTE was measured for the films prepared from the compositions including "BPDA/PMDA and TFDB" as the base components, and BACH, the second diamine represented by the above Chemical Formula 3, in which the content of BACH was varied from 0 mol % to 70 mol %, based on the total amount of the first and second diamines, that is the total amount of TFDB and BACH, depending on the temperature.

As shown from FIG. 1, the polyimide films prepared from the compositions including equal to or less than 30 mol % of BACH based on the total amount of the first and second diamines according to the embodiment show significantly decreased CTE over the glass transition temperature ("Tg") compared with the films prepared from a composition that does not include BACH (that is, the content of BACH is 0%), or from the compositions that include more than 30 mol % of BACH based on the total amount of the first and second diamines.

The second diamine represented by Chemical Formula 3 has one bulky alicyclic organic group, i.e., a cyclohexylene group, between two phenyl groups. Generally, a monomer including a bulky group is believed to increase CTE of a polymer prepared from a composition including the monomer, since the monomer inhibits formation of the charge transfer complex ("CTC") of the polymer as the free volume of the polymer increases. Nevertheless, according to the above embodiment, the composition including a certain specific content of the monomer decreases the CTE, compared with the composition that does not include the monomer, or the compositions including the monomer in an amount beyond that specific content. The composition including the monomer represented by the above Chemical Formula 3 in a certain specific content is believed to decrease CTE in a high temperature range over the glass transition temperature ("Tg"), as a crystal of a polymer prepared from the composition may be suppressed by the presence of the cyclohexylene group in the monomer to control the polyimide chain behavior, thereby increasing the modulus of a film prepared from the polymer.

As described above, a polyimide film prepared from the composition may have a coefficient of thermal expansion of less than or equal to about 300 parts per million per degree Centigrade ("ppm/° C."), for example less than or equal to about 200 parts per million per degree Centigrade ("ppm/° C."), in a temperature range of 50° C. to 400° C., and may have a further decreased CTE of less than or equal to about 50 parts per million per degree Centigrade ("ppm/° C."), in a temperature range of 50° C. to 300° C. The polyimide film having such a decreased CTE may have a very advantageous effect in manufacturing an optical device.

As later described in the examples, the polyimide films prepared from the compositions according to the embodiment may have a glass transition temperature ("$T_g$") of greater than or equal to about 300° C., a 0.5% weight decrease temperature ("$T_d0.5$") of greater than or equal to about 400° C., and a 1.0% weight decrease temperature ("$T_d1.0$") of greater than or equal to about 400° C. The polyimide films having the above temperature parameters also have high thermal stability.

According to another embodiment, provided is a polymer represented by following Chemical Formula 4, a polymer represented by following Chemical Formula 5, or a polymer represented by a combination of Chemical Formula 4 and Chemical Formula 5:

Chemical Formula 4

-continued

Chemical Formula 5

In Chemical Formula 4 and Chemical Formula 5,

$R^1$ to $R^5$, and n1 to n3 are the same as defined in the above Chemical Formula 1 to Chemical Formula 3, x is a positive real number equal to or less than 0.3, for example 0.001≤x≤0.3, for example 0.005≤x≤0.25, for example 0.01≤x≤0.1.

The polymer represented by Chemical Formula 5 may be prepared from the polymer represented by Chemical Formula 4 by thermal or chemical curing.

In Chemical Formula 4 and Chemical Formula 5, $R^1$ may be a group derived from a tetracarboxylic acid dianhydride represented by the above Chemical Formula 1, and $R^2$ may be a group derived from a first diamine represented by Chemical Formula 2.

In an exemplary embodiment, $R^1$ and $R^2$ are the same or different, and may be each independently selected from the following chemical formulae:

$R^1$:

$R^2$:

The polymers represented by Chemical Formula 4 and Chemical Formula 5 may be prepared by polymerizing a tetracarboxylic acid dianhydride represented by Chemical Formula 1, and a first diamine represented by Chemical Formula 2, as well as a second diamine represented by Chemical Formula 3.

The method of preparing a polyamide acid or a polyimide by polymerizing a diamine and a dianhydride is well known in the related art. For example, the polyamic acid represented by Chemical Formula 4 or the polyimide represented by Chemical Formula 5 may be prepared by mixing and polymerizing a diamine, for example, a first diamine represented by Chemical Formula 2 and/or a second diamine represented by Chemical Formula 3 with a dianhydride, for example, a dianhydride represented by Chemical Formula 1. Further, the polyimide represented by Chemical Formula 5 may be prepared by thermal or chemical imidization of the polyamic acid represented by Chemical Formula 4. In this case, a poly(imide-amic acid) represented by a combination of Chemical Formula 4 and Chemical Formula 5 may be prepared by partially imidizing the polyamic acid. As such, a method of preparing the polymer is well known in the art, and therefore, a detail description for the method is not described here.

According to yet another embodiment, provided is an optical film prepared from the composition or the polymer.

As described above, the optical film may have an average light transmittance of greater than or equal to about 80%, for example greater than or equal to about 85%, in a wavelength range of 380 nanometers to 800 nanometers, and may have an average light transmittance of greater than or equal to about 50%, particularly of greater than or equal to about 55%, in a wavelength of 400 nanometers.

Further, the film may have a thickness retardation ($R_{th}$) of equal to or less than about 1,000 nanometers (nm), for example of equal to or less than about 900 nanometers (nm), for example of equal to or less than about 800 nanometers (nm).

Moreover, the optical film may have a coefficient of thermal expansion of less than or equal to about 300 parts per million per degree Centigrade ("ppm/° C."), for example less than or equal to about 200 parts per million per degree Centigrade ("ppm/° C.") in a temperature range of 50° C. to 400° C., and may have a further decreased CTE of less than or equal to about 50 parts per million per degree Centigrade ("ppm/° C.") in a temperature range of 50° C. to 300° C.

As such, the optical film according to the embodiment has good optical and thermal properties, and in an embodiment, has decreased CTE and high light transmittance, and thus may have very advantageous effects in manufacturing a display device, for example, a flexible substrate.

The optical film may be prepared by coating and casting the composition according to an embodiment on a substrate, followed by extending and curing to obtain a polyimide film. The method of manufacturing the film is also well known in the related art, and therefore, a detailed description thereof is omitted here.

According to still another embodiment, provided is an optical device including the optical film.

The optical device may be a liquid crystal device ("LCD"), an organic light emitting diode ("OLED") or a complementary metal-oxide semiconductor ("CMOS"), and is not limited thereto.

Further, the optical film may be useful to prepare a flexible substrate due to its low CTE.

Hereinafter, the technology of this disclosure is described in detail with reference to examples. The following examples and comparative examples are not restrictive but are illustrative.

EXAMPLES

Examples 1 to 4: Synthesis of Polyamic Acids

A dianhydride mixture of 80 mol % (3.34 g) of 3,3',4,4'-biphenyltetracarboxylic dianhydride ("BPDA") and 20 mol % (0.62 g) of pyromellitic dianhydride ("PMDA") and a diamine mixture of 2,2'-bis(trifluoromethyl)benzidine ("TFDB") and 1,1'-bis(4-aminophenyl)cyclohexane ("BACH") are mixed and polymerized to prepare polyimides. In the diamine mixture, the content of BACH is 0 mol % in Comparative Example 1, 0.5 mol % in Example 1, 1.0 mol % in Example 2, 5.0 mol % in Example 3, 10.0 mol % in Example 4, 25 mol % in Example 5, 50.0 mol % in Comparative Example 2, and 70.0 mol % in Comparative Example 3. 1 mole of the dianhydride mixture and 1 mole of the diamine mixture are reacted to prepare polyamic acid polymers.

Particularly, 40.4 ml of NMP as a solvent is added to a 250 liter reactor purged with $N_2$ gas, and the diamine mixture of TFDB and BACH is added thereto at room temperature (25° C.). The reaction mixture is agitated at 100 revolutions per minute (rpm) for 30 minutes to be completely dissolved. Then, the dianhydride mixture of BPDA and PMDA is added at once, and agitated at room temperature to form polyamic acid (it takes about 1 to 2 days). The obtained polyamic acid is stored in a refrigerator.

Synthesis Example: Manufacturing Polyimide Films

The polyamic acids according to Examples 1 to 5 and Comparative Examples 1 to 3 are spin coated on a substrate, and maintained on a hot plate set on 80° C. for 30 minutes for drying. Then the films are put in a furnace, and are heat treated from room temperature to about 300° C. at a heating rate of 10° C./minute to obtain polyimide films.

Further, in order to evaluate the films, the films are subject to further heat treatment from room temperature to 300° C. at a heating rate of 10° C./minute, then maintained at 300° C. for 60 minutes to obtain required films.

Experimental Example: Evaluation of Properties of the Films

Figure 2:
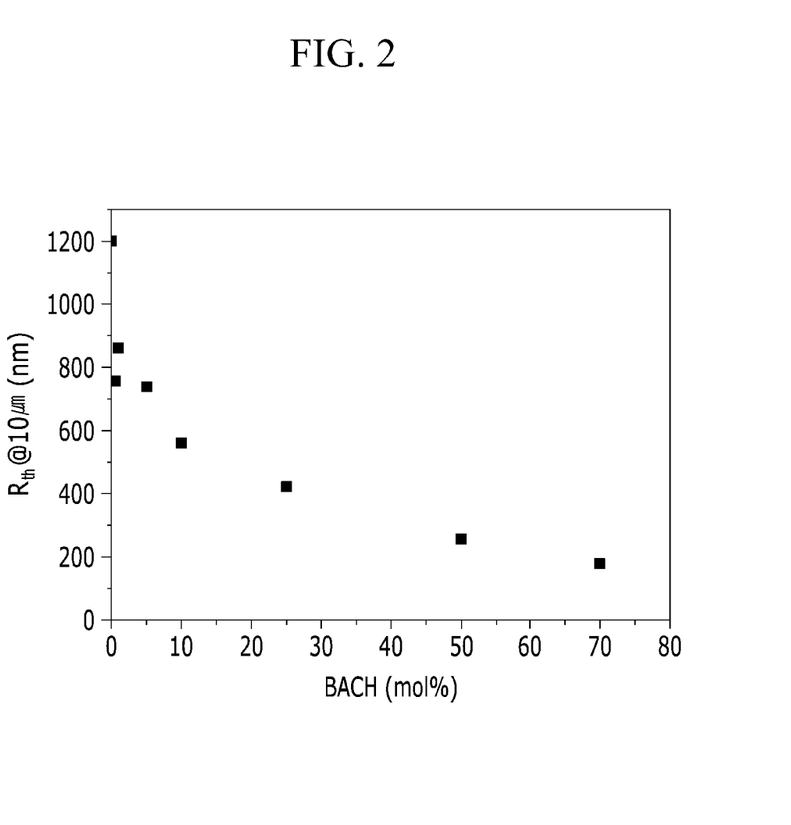
FIG. 2 shows graphs of thickness retardation at 10 micrometers ($R_{th}$ @ 10 μm) (nanometers, nm) versus the content of BACH (1,1-bis(4-aminophenyl)cyclohexane) (mole percent, mole %) used in preparing polyimide films.

The film thickness, light transmittance at a specific wavelength, film thickness retardation ($R_{th}$), CTE at a specific temperature range, glass transition temperature ("$T_g$"), and 0.5% weight decrease temperature ("$T_d0.5$") and 1.0% weight decrease temperature ("$T_d1.0$") are measured, and the results are summarized in Table 1. The graphs showing changes of CTE and $R_{th}$ of the films depending on the content of BACH are also shown in FIG. 1 and FIG. 2, respectively.

TABLE 1

|  | Film thickness (μm) | Transmittance (%) | | | Rth (nm) | CTE (ppm/° C.) | | | Tg (° C.) | Td0.5 (° C.) | Td1.0 (° C.) |
| --- | --- | --- | --- | --- | --- | --- | --- | --- | --- | --- | --- |
|  |  | 380~800 nm | 400 nm | 430 nm |  | 50~250 | 50~300 | 50~400 |  |  |  |
| Comp. Exam. 1 | 10 | 88 | 50 | 82 | 1200 | 11 | 13 | 756 | 323 | 485.8 | 524 |
| Exam. 1 | 8 | 87 | 52 | 81 | 758 | 11 | 13 | 172 | 331 | 467.2 | 505 |
| Exam. 2 | 16 | 88 | 61 | 81 | 860 | 12 | 15 | 152 | 322 | 468.8 | 501 |
| Exam. 3 | 16 | 88 | 57 | 79 | 740 | 17 | 20 | 113 | 323 | 461.9 | 483 |
| Exam. 4 | 10 | 88 | 42 | 78 | 560 | 22 | 26 | 114 | 320 | 445.6 | 473 |
| Exam. 5 | 9 | 86 | 25 | 68 | 420 | 36 | 41 | 148 | 338 | 424.2 | 456 |
| Comp. Exam. 2 | 16 | 84 | 25 | 54 | 257 | 50 | 55 | 336 | 344 | 395.9 | 418 |
| Comp. Exam. 3 | 16 | 83 | 21 | 47 | 178 | 55 | 60 | 664 | 346 | 391.1 | 411 |

As shown from Table 1, the polyimide films prepared from the compositions including equal to or less than 30 mol %, for example equal to or less than 25 mol %, of BACH based on the total amount of the diamine according to Example 1 to Example 5 show an average light transmittance of greater than or equal to about 80%, for example greater than or equal to about 85%, in a wavelength range of 380 nanometers to 800 nanometers, which is similar to the film prepared from a composition that does not include BACH. However, the films prepared from the composition according to Comparative Example 2 and Comparative Example 3 show a little decrease in light transmittance. These results may be caused by the decreases in transmittance in the wavelength of 400 nm or 430 nm. That is, the films prepared from the compositions according to Comparative Example 2 and Comparative Example 3 have significantly decreased transmittance in the wavelength of 400 nm or 430 nm, which may be explained by the fact that the polyimide film has increased yellowness as the content of BACH increases.

Further, as shown from Table 1, the films prepared from the composition according to Example 1 to Example 5 have significantly decreased thickness retardation ($R_{th}$) compared with the films prepared from a composition that does not include BACH at all. Although it is recognized that as the content of BACH increases, $R_{th}$ decreases, the films according to Comparative Example 2 and Comparative Example 3 show significantly deteriorated optical properties except for the $R_{th}$.

As for the CTE, in the temperature range of 50° C. to 250° C., or of 50° C. to 300° C., the films according to Comparative Example 1 has lower CTE than the films according to Example 1 to Example 5. However, in the high temperature range, for example, from 50° C. to 400° C., the films according to Example 1 to Example 5 show significantly decreased CTE compared with the films according to the Comparative Examples. As mentioned above, such high temperature process is desired in manufacturing optical devices, and thus a lower CTE in a high temperature range over the glass transition temperature ("Tg") may be very advantageous in the process.

Glass transition temperature, or 0.5% or 1.0% weight decrease temperature is maintained in good values in the films according to the Examples, as well as to the Comparative Examples.

Accordingly, the film according to the embodiment of the present invention has useful optical properties, such as transparency, low optical anisotropy, etc., and has a low CTE in the high temperature region, as well as good thermal stabilities, and thus is very advantageous in manufacturing an optical device, such as a flexible display substrate.

While this disclosure has been described in connection with what is presently considered to be practical exemplary embodiments, it is to be understood that the invention is not limited to the disclosed embodiments, but, on the contrary, is intended to cover various modifications and equivalent arrangements which are included within the spirit and scope of the appended claims.

What is claimed is:

1. An optical film having an average light transmittance of greater than 50% in a wavelength of 400 nanometers, the optical film prepared from a composition comprising:
   a tetracarboxylic acid dianhydride represented by Chemical Formula 1, a first diamine represented by Chemical Formula 2, and
   a second diamine represented by Chemical Formula 3,
   wherein an amount of the second diamine represented by Chemical Formula 3 is equal to or less than 5 mol % based on the total amount of the first and second diamines:

Chemical Formula 1

Chemical Formula 2

Chemical Formula 3 wherein in Chemical Formulae 1 to 3,
$R^1$ and $R^2$ are the same or different, and are each independently a substituted or unsubstituted C4 to C20 alicyclic organic group, or a substituted or unsubstituted C6 to C30 aromatic organic group, wherein the aromatic organic group comprises one aromatic ring, two or more aromatic rings fused together to provide a condensed ring system, or two or more moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, and a substituted or unsubstituted C6 to C15 arylene group,
$R^3$ to $R^5$ are the same or different, and are each independently selected from a C1 to C20 alkyl group, a C6 to C20 aryl group, and a halogen,
n1 is an integer from 0 to 5, and
n2 and n3 are the same or different, and are each independently an integer from 0 to 4,
wherein the tetracarboxylic acid dianhydride represented by Chemical Formula 1 is a combination of 3,3',4,4'-biphenyl tetracarboxylic dianhydride and pyromellitic dianhydride in a mole ratio of about 60 to 90:about 10 to 40,
wherein the first diamine represented by Chemical Formula 2 is represented by the following chemical formula:

wherein the film has a coefficient of thermal expansion of less than or equal to about 200 parts per million per degree Centigrade in a temperature range of 50° C. to 400° C., and
wherein the film has a thickness retardation ($R_{th}$) of equal to or less than about 900 nanometers.

2. The optical film according to claim 1, wherein an amount of the second diamine represented by Chemical Formula 3 is from 0.1 mol % to 5 mol % based on the total amount of the first and second diamines.

3. The optical film according to claim 1, wherein an amount of the second diamine represented by Chemical Formula 3 is from 0.5 mol % to 5 mol % based on the total amount of the first and second diamines.

4. The optical film according to claim 1, wherein one or more of $R^3$ to $R^5$ are the same or different, and are each independently a C1 to C4 alkyl group, a phenyl group, or a halogen.

5. The optical film according to claim 1, wherein the second diamine represented by Chemical Formula 3 is 1,1'-bis(4-aminophenyl)cyclohexane.

6. An optical device comprising the optical film according to claim 1.

* * * * *